June 25, 1935. A. J. SCHOLTES 2,006,325
SCOOTER AND SLEIGH RUNNER
Filed June 8, 1934
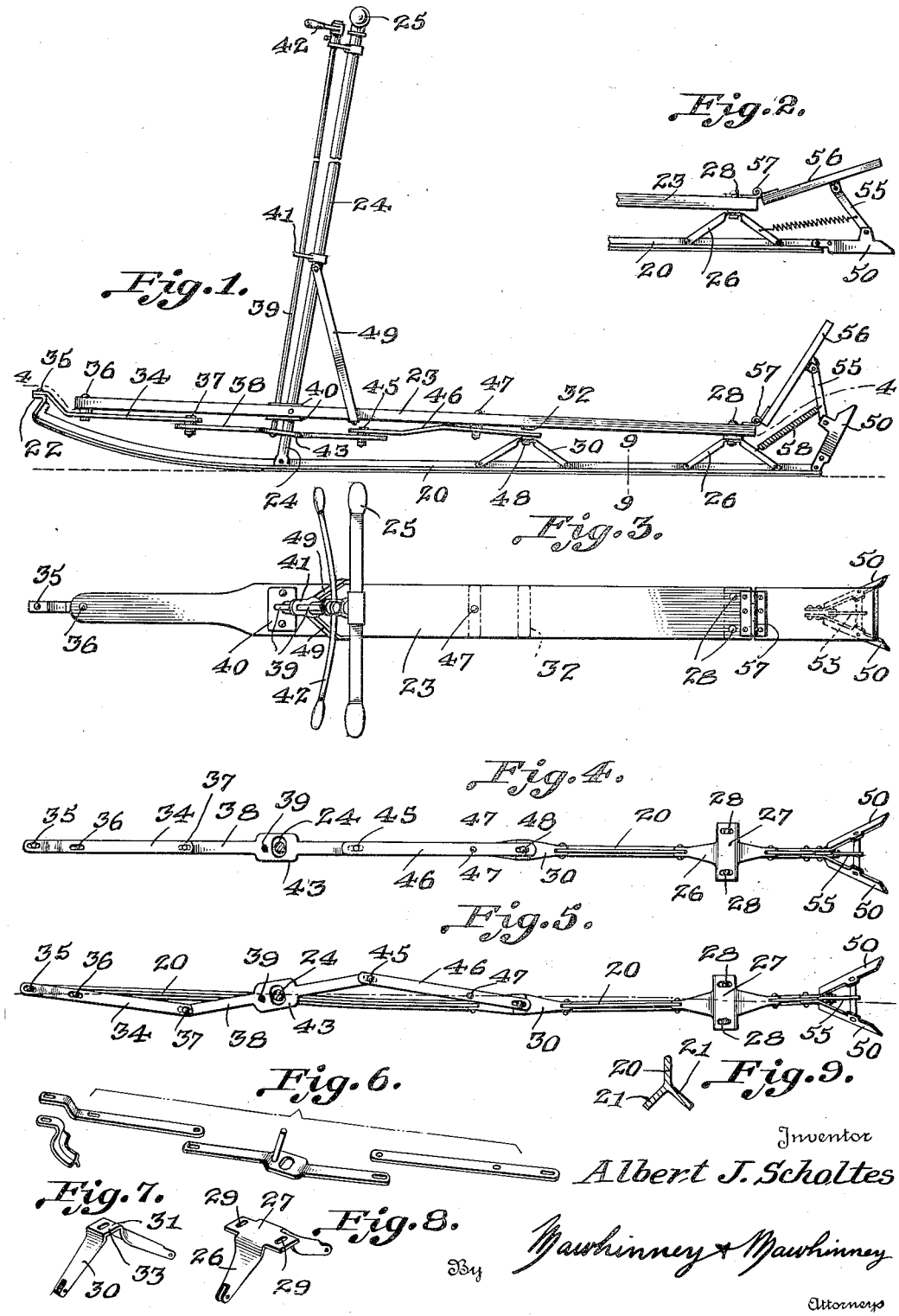
Inventor
Albert J. Scholtes
By Mawhinney & Mawhinney
Attorneys Patented June 25, 1935

2,006,325

UNITED STATES PATENT OFFICE 2,006,325

SCOOTER AND SLEIGH RUNNER

Albert J. Scholtes, Baltimore, Md.

Application June 8, 1934, Serial No. 729,670

8 Claims. (Cl. 280—23)

The present invention relates to runners for sleighs and the like, and more particularly to an improved construction of runner and flexing means therefor adaptable to sleighs, scooters and the like.

An object of the present invention is to provide a vehicle of the type admitting the rider to stand in upright position, and wherein the rider while in such position may guide or control the movements of the vehicle, and may utilize one foot for supporting the body on the vehicle and the other foot to afford locomotion in starting the vehicle or otherwise controlling the same when not actually in flight.

The invention also aims at a novel construction of operating or guiding means adapted to flex the runner throughout substantially its entire length to thus afford not only a better grip of the runner on the ice and snow to insure the responses of the vehicle to changes in direction, but to also prevent lateral drawing across the contact face of the runner tending to decrease the speed of the vehicle and injure the contact surface or edges of the runner.

Another object of the present invention is to provide a vehicle of this type which has a standard with suitable handles for supporting the rider in standing position on the vehicle and to provide runner flexing means with a handle disposed relatively to the first handle so that easy access may be had to the runner flexing means and thus the vehicle be controlled without requiring the rider to shift position on the vehicle and wherein the operation is direct and positive so that the vehicle will respond to slight flexing of the runner in either direction.

Another object of the invention is to provide an improved flexing means for runners which will flex the same at such points as to curve the runner in either direction to follow lengthwise of the runner in the curved track or path assumed by the runner when flexed.

The invention also embodies an improved construction of brake which may be foot operated so as to obtain the advantage of the weight of the rider and which is so constructed as to be effective in checking the speed of the vehicle to the desired extent.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation of a vehicle of the scooter or rider standing type with the brake released.

Figure 2 is a fragmentary side elevation of the rear end of the same showing the brake in lowered and operating position.

Figure 3 is a top plan view of the vehicle.

Figure 4 is a horizontal section taken lengthwise through the upper portion of the vehicle with the platform removed, showing the runner flexing and brake mechanism with the parts in straight line position.

Figure 5 is a similar view showing the parts adjusted for flexing the runner to change direction of the vehicle.

Figure 6 is a detail perspective view of the runner flexing links removed from the vehicle, the parts being separated and shown in their relative positions with respect to the forward end of the runner.

Figure 7 is a detail perspective view of the intermediate brace.

Figure 8 is a like view of the rear end brace, and

Figure 9 is an enlarged transverse section taken on the line 9—9 of Figure 1 through the runner, showing the double contact edge.

Referring now to the drawing, and first to the form shown in Figures 1 to 9, 20 designates a flexible runner which may be of any suitable construction but which in the present instance is shown as of the form disclosed particularly in Figure 9. The runner 20 has a vertical web portion with diverging edge parts 21 at its lower edge forming a pair of spaced cutting or contact edges for direct engagement with the ice and which presents a hollow angular cavity extending lengthwise at the bottom of the runner admitting of the quick and easy sharpening of the spaced edges. The runner 20 is curved upwardly at its forward end with the desired slope and terminates in a brace lug 22 which is disposed substantially horizontally at the forward end of the runner and well above the plane of the body portion of the runner.

Mounted above the runner is a platform 23 which may be relatively narrow and of sufficient width to comfortably accommodate the foot of the operator or rider. The forward portion of the runner 20 is connected to the platform 23 by means of a post 24 which may be riveted to the vertical flange of the runner 20 and extends upwardly through a suitable opening formed in the platform 23 to the desired height, and this height may be sufficient for supporting a pair of handle bars 25 at the upper end of the post 24 in position of easy reach and access of the rider. Of course, if the rider is to assume a sitting or lower position, the post 24 is adjusted in length to meeth the requirements. The platform 23 is connected at its rear end to the rear end portion of the runner 20 by means of a rear brace 26 which may have forked diverging arms riveted to the flange of the runner 20 and which at its upper portion is provided with a transversely extending plate 27, shown in Figure 8, upon which the rear end of the platform 23 may rest. Bolts 28 are carried by the platform and extend downwardly through slots 29 formed in the opposite ends of the plate 27, the slots 29 extending lengthwise of the vehicle to admit of the slight pivotal action of the rear brace 26 when the runner is flexed.

The platform 23 is also supported by an intermediate brace 30 which is secured to the flange of the runner 20 and which is provided with a flat plate portion 31 at its upper end adapted to slidably bear against a transversely disposed wear plate 32 secured against the under side of the platform 23 in any suitable manner, the brace 30 adapted to slide transversely beneath the platform when the runner 20 is flexed. The plate 31 of the intermediate brace has a slot 33 formed therein extending lengthwise of the vehicle for receiving a pivotal connection of the operating means to admit free movement thereof.

The improved operating means for flexing the runner 20 engages the runner at its forward end and also at an intermediate point and is adapted to exert opposite and equal pressures at such points to effect the flexing of the runner 20 throughout substantially its entire length and to equal degrees so that the runner will be flexed into a natural curve following the path of the runner and vehicle when being swerved or guided in opposite directions. This runner flexing or operating means comprises a front lever 34 which at its forward end is secured to the runner lug 22 by a pivot 35. The lever 34 is suitably offset to project beneath the forward end of the platform 23 and is pivotally connected to the forward end of the platform by a pivot 36 which engages the lever 34 near its forward end.

The long arm of the lever 34 extends rearwardly beneath the platform and is connected at its rear end by a pivot 37 to the forward end of a swinging arm 38 which is fixed at its intermediate portion upon the lower end of a rod 39 which extends upwardly through the platform 23 adjacent the post 24, and preferably at the forward side thereof. The rod 39 may be rotatably supported through the platform 23 by bearing plates 40 or the like which may also surround the post 24, and by one or more brackets 41 carried by the post 24 at intermediate points, depending upon the height of the post 24. A pair of handle bars 42 is mounted upon the upper end of the rod 39 in proximity to the handle bars 25 of the post so that the rider may grasp both handle bars 25 and 42 for compressing the same together as desired for turning the vehicle in the desired direction.

The arm 38 is provided at its intermediate portion and about the post with a transversely enlarged and slotted portion 43 for freely receiving the post therethrough, the slot extending transversely to admit the free turning of the arm with the rod 39 without interference from the post.

The rear end of the arm 38 is connected by a pivot 45 with the long arm of a rear lever 46. The arm 38 extends lengthwise beneath the platform 23 and the rear lever 46 also extends lengthwise beneath the platform. The lever 46 is connected near its rear end by a pivot 47 to the under side of the platform 23, and the rear end of the lever 46 is connected to the runner intermediate brace 30 by a pivot 48 which engages the slot 33 of the brace so that the pivot 48 may have a longitudinal sliding movement in the slot but has no lateral free play so as to move the brace 30 and the intermediate portion of the runner therewith when the lever 46 is turned on its pivot 47.

The standard 24 may be reinforced by a brace 49 which is secured at its lower end to the platform 23 and extends upwardly to a suitable height on the post or standard 24. The rear end of the runner 20 is provided with a brake, and the brake comprises a pair of rearwardly and downwardly diverging blades 50 which are secured together by a rivet 51 or the like at their forward convergent ends, the extremities of the blades being spaced apart and extending from the rivet 51 to form ears engaging the opposite sides of the web of the runner 20 and are pivoted thereto by a pivot 52. The blades 50 have lugs 53 extending upwardly from their upper edges and are interconnected by a cross rod 54 upon the intermediate portion of which is connected one end of a link 55 which, as shown in Figures 1 and 2 particularly, is pivotally connected at its other end against the under side of a treadle 56 which is hinged at 57 to the rear end of the platform 23. The link 55 is proportioned in length such that when the treadle 56 is forced down by the foot the blades 50 will be swung down and engage the ground. A spring 58 is preferably disposed between the brake and the body portion of the vehicle to normally hold the blades 50 raised as shown in Figure 1, and in the present instance the spring 58 has one end attached to the rear brace 26 and its other end attached to the link 55 adjacent the rod 54.

In operation, the vehicle or scooter is normally in the position shown in Figure 1 with the brake 50 elevated and with the runner 20 in its normal straight line position. In this instance the handle bars 25 and 42 are in the same relative positions at opposite ends. The rider may step on the platform 23 with one foot and use the other foot to propel the device. As soon as the device is coasting or moves rapidly, both feet may be placed on the platform and the rider balances himself on the device by holding the handle bars 25. When it is desired to change the direction of the vehicle, or turn, the rider merely compresses the right or left hand ends of the handle bars 25 and 42 together with the result that the rod 39 is turned slightly so as to swing the arm 38 therewith in the desired direction. As shown in Figure 5, when the rod 39 is turned in one direction the forward end of the arm 38 is swung to the left with the result that the forward lever 34 flexes the forward end of the runner 20 to the right. At the same time, the rear end of the arm 38 swings the rear lever 46 in a direction to move the brace 30 to the left and consequently flex the intermediate portion of the runner 20 to the left so that the runner from end to end assumes a substantially continuous curve following the general path of travel of the vehicle in making a turn to the right. Of course, when the rod 39 is turned in an opposite direction, the arm 38 is swung oppositely, swings the lever 34 and 46 in opposite directions and flexes the runner 20 to the left or opposite to that shown in Figure 5.

When it is desired to check the speed or stop the device it is only necessary for the rider to press backwardly and downwardly on the treadle 56 against the tension of spring 58 and to gradually throw the weight of the body on the treadle 56 for swinging the brake blades 50 downwardly to engage the surface and then to bite into the surface to the desired extent. The wedge-shape of the brake is such that in cutting into the snow or ice the brake will effect a considerable drag upon the device.

It will be noted that the platform 23 is solidly mounted upon the runner 20 and at the same time, incident to the mounting of the intermediate and rear brackets 30 and 26, the runner 20 may be flexed either to the right or to the left and held in such position with comparative ease on the part of the rider and without disturbing the mounting of the platform.

The device is light in weight, easily handled and is of such construction that it is strong and durable.

It is obvious that various changes and modifications may be made in the details of construction and design of the above specifically described embodiment of this invention without departing from the spirit thereof, such changes and modifications being restricted only by the scope of the following claims:—

What is claimed is:—

1. A sliding vehicle, comprising a platform, a flexible runner mounted for lateral movement beneath the platform, a guide rod rotatably mounted on the platform and having an arm with oppositely extending portions disposed lengthwise of the platform and runner, and spaced levers pivoted at their intermediate portions beneath the platform with one end of each lever connected to an adjacent portion of the runner and with their other ends pivoted to the opposite ends of the arm for swinging the levers in opposite directions when the rod and arm are turned and flexing the runner at spaced points in opposite directions into a continuous longitudinal curve.

2. A slide scooter comprising a platform, a runner disposed beneath the platform, a post secured to the runner near its forward end and extending upwardly through the platform for steadying a rider on the platform, a longitudinally shiftable brace disposed between the rear ends of the runner and the platform, a forward lever pivoted beneath the forward end of the platform with one end pivotally connected to the forward end of the runner, a rear lever pivoted beneath the platform with its rear end pivotally connected to an intermediate portion of the runner in rear of the post, and a guide rod rotatably mounted on the platform adjacent said post and having an arm fixed upon its lower end with one end pivotally connected to the rear end of said forward lever and with its other end pivotally connected to the forward end of the rear lever whereby turning of the rod and arm is adapted to swing said levers in opposite directions and flex the runner in opposite directions and at spaced points.

3. A slide scooter comprising a platform, a single runner movably mounted beneath the platform, a pair of levers pivotally mounted in spaced relation lengthwise of and beneath the platform, the remote ends of said levers having pivotal connection with spaced portions of said runner, and an operating member carried by the platform adapted to be turned and having opposed connections with the adjacent ends of said levers for swinging the same in opposite directions and flexing the runner into a continuous lengthwise curve.

4. A scooter slide or the like, comprising a platform, a single flexible runner beneath the platform, lengthwise spaced apart connecting devices between the runner and the platform, and separate oppositely acting and laterally operable thrust means between the platform and the runner disposed in lengthwise spaced relation to said connecting devices for bowing the runner and guiding the scooter.

5. A coasting scooter, comprising a body portion, a single flexible ice and snow runner disposed intermediately and longitudinally beneath the body portion, front and rear pivoted and longitudinally shiftable connections between the runner and the body portion in substantially vertical alinement with the runner, and vertically disposed oppositely operating curving means on the body portion connected to the forward runner connection and to an intermediate portion of the runner spaced from the other pivoted connections for flexing the forward and intermediate portions of the runner in laterally opposite directions and curving the runner from end to end.

6. A single runner coasting scooter, comprising a long narrow body portion, a single flexible ice and snow runner disposed intermediately and longitudinally beneath the body portion, vertically alined connecting means between the rear portions of the runner and body portion, a steering post mounted on the body portion and rising therefrom, and runner connections between the steering post and points on the runner spaced from the connecting means for laterally bending the runner at spaced points in opposite directions beneath the body portion.

7. A single runner slide scooter, comprising a long narrow body portion, a single flexible ice and snow runner centered beneath the body portion, connections disposed vertically between the runner and the body portion, a steering post rising from the body portion, and interconnected and oppositely acting flexing means connected between the steering post and the single runner forwardly of the connections for flexing the forward portion of the runner laterally when the steering post is turned.

8. A single runner snow and ice scooter, comprising a body portion, a single continuous flexible runner centered beneath and extending from end to end of the body portion, and means for laterally flexing the runner to bow the same from end to end and change the direction of travel of the scooter, said runner having a ground contacting edge portion bifurcated with the diverging flanges thereof presenting laterally and oppositely offset cutting edges and supporting surfaces extending without interruption from end to end of the runner to alternately take up the weight and pressure of the scooter as the runner is flexed from side to side and the scooter is banked to take curves, said bifurcated edge of the runner providing a relatively wide base support for maintaining the center of gravity between the edge portions during the tilting of the single runner scooter.

ALBERT J. SCHOLTES.